US007839799B2

United States Patent
Navarro et al.

(10) Patent No.: US 7,839,799 B2
(45) Date of Patent: Nov. 23, 2010

(54) MIDDLEWARE COMPONENTS FOR BUNDLING SERVICE INVOCATIONS

(75) Inventors: Alfredo Navarro, Dublin (IE); Jerh O'Connor, Roscommon (IE); Christian Richter, Dublin (IE); Antonio Sanso, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 12/209,351

(22) Filed: Sep. 12, 2008

(65) Prior Publication Data
US 2010/0067402 A1    Mar. 18, 2010

(51) Int. Cl.
*H04L 12/28* (2006.01)
(52) U.S. Cl. .................................... 370/254
(58) Field of Classification Search ........... 370/254
See application file for complete search history.

(56) References Cited

U.S. PATENT DOCUMENTS

| 6,006,264 | A | 12/1999 | Colby et al. |
| 6,154,776 | A | 11/2000 | Martin |
| 6,308,216 | B1 | 10/2001 | Goldszmidt et al. |
| 6,760,775 | B1 | 7/2004 | Anerousis et al. |
| 7,124,062 | B2 | 10/2006 | Gebhart |
| 7,634,430 | B2 * | 12/2009 | Huberman et al. ......... 705/26 |
| 2002/0184403 | A1 * | 12/2002 | Dahlin et al. ............ 709/316 |
| 2007/0104115 | A1 * | 5/2007 | Decasper et al. ......... 370/254 |
| 2007/0233693 | A1 * | 10/2007 | Baxter et al. .............. 707/10 |
| 2007/0266159 | A1 * | 11/2007 | Doppelhamer et al. ..... 709/226 |
| 2007/0274214 | A1 | 11/2007 | Logvinov |
| 2009/0292797 | A1 * | 11/2009 | Cromp et al. ............. 709/223 |

OTHER PUBLICATIONS

Piyush Maheshwari et al.; "Qos-Based Message-Oriented Middleware for Web Services", WISE 2004 Workshops, LCNS 3307, pp. 241-251, 2004.
Giorgia Lodi; "Middleware Services for Dynamic Clustering of Application Servers (Ph.D. Thesis)"; Technical Report UBLCS-2006-06, Mar. 2006, Department of Computer Science, University of Bologna; Mura Anteo Zamboni 7, 40127 Bolognia (Italy), pp. 1-99.

* cited by examiner

*Primary Examiner*—Ayaz R Sheikh
*Assistant Examiner*—Peter Chau
(74) *Attorney, Agent, or Firm*—Cantor Colburn LLP; Ayla A. Lari

(57) ABSTRACT

A machine readable medium having instructions stored thereon to cause the machine to execute a method is provided. The method includes analyzing a received client request and available statistics to determine whether the request is likely to succeed and whether the request should be bundled with other requests. If the request is determined to not be likely to succeed, an error message is outputted to the client. If the request is determined to be likely to succeed but should not be bundled with other requests, a first service provider relevant to the request is invoked. If the request is determined to be likely to succeed and should be bundled with other requests, the request is bundled with the other requests and, subsequently, the first and/or a second service provider relevant to the bundled requests is invoked. The available statistics are then updated.

17 Claims, 2 Drawing Sheets

MIDDLEWARE COMPONENTS FOR BUNDLING SERVICE INVOCATIONS

BACKGROUND

Figure 1:
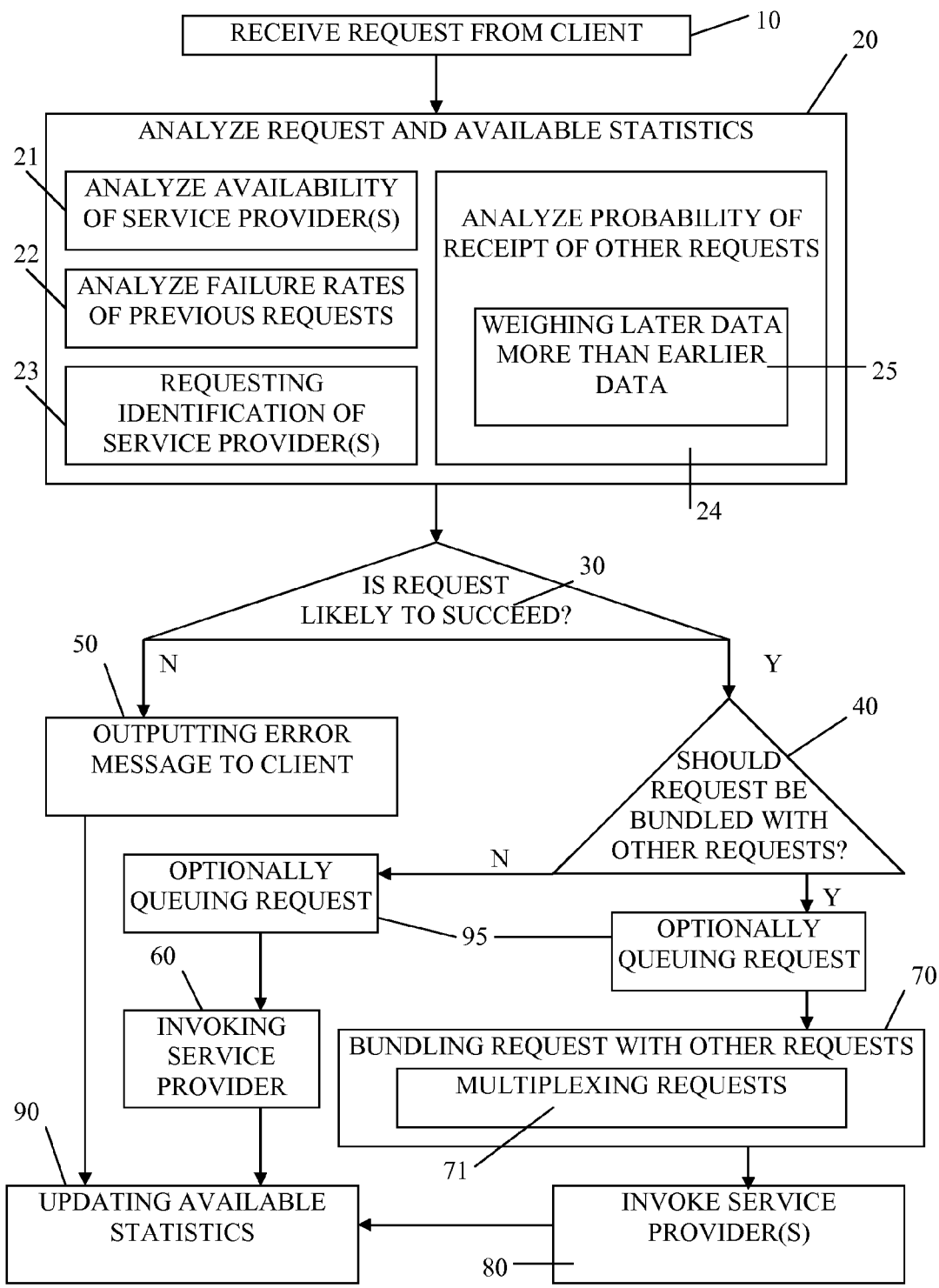

Aspects of the present invention are directed to computing systems and, more particularly, to middleware components of computing systems that allow for a bundling of service invocations.

Generally, a deployed computing solution that relies on a variety of remote accessible services may slow down or otherwise fail to perform properly during its normal operations. This can occur for various reasons including, but not limited to, at least a portion or a set of the remote services being actually available for only limited or sub-optimal periods of time or because the remote services are distributed at a relatively large distance from the actual application of the computing solution. Moreover, where the computing solution may already be operating relatively slowly, the already relatively slow response times of the remote services may be further delayed by additional invocations of the remote services. Such additional invocations may be issued even though it may be known that the remote services have a current high load in effect.

Presently, some of these issues have been dealt with by way of the use of Quality of Service (QoS) enabled hardware for network infrastructure. While this solution may enhance the response times of remote services, it requires an approach that is applied throughout a system. That is, if one of the hardware components in the system does not support QoS, the system will not follow defined QoS constraints once the non-supportive node is under load and, as such, the system will violate the QoS constraints. Moreover, this solution does not provide a means by which the system distinguishes between various types of requests. Thus, it may require unnecessary processing requirements for a QoS rule to take effect. Also, this approach does not consider business logic constraints and, as an example, for the building of a dataset, a specific service may be redundantly called several times in a single sequence.

In another approach, an establishment of dedicated communication channels tends to reduce the latency and load of networks. However, this approach may not prevent remote services from still being invoked even if the probability of a successful invocation is relatively very limited. Also, this approach cannot benefit from business logic data.

Alternatively, proxy infrastructure may be employed in a system. Here, a proxy solution caches previous service invocations and makes use of an analysis of the results of the previous service invocations. This approach has drawbacks, however, in that it does not cover steadily newly issued invocations and their handling. Moreover, in general, a proxy solution does not take statistics, current load factors or business logic into account.

Still other approaches include the use of a service aware network infrastructure component, the applying of QoS mechanisms to general network traffic, the use of a mechanism to refer a flow of a network to a best-fit server or the definition of routing policies based on QoS constraints. Again, however, each of these approaches has drawbacks. The service aware network infrastructure component is applied equally to application specific routers (i.e., L7 routers) or application gateways (i.e., in local area networks) but does not hold back and/or prevent a request and does not capture a series of them. The applying of QoS mechanisms to general network traffic does not refer to thresholds or other parameters defined by a QoS rule. The mechanism to refer a flow of a network to a best-fit server describes a routing mechanism with a dynamic definition of a best-fit server but does not refer to any usage of a QoS rule to be applied at a component level to collect/reject/transmit communications. Lastly, the definition of routing policies based on QoS constraints does not refer to a state of a transmission and/or its possible rejection.

SUMMARY

In accordance with an aspect of the invention, a machine readable medium having instructions stored thereon to cause the machine to execute a method of performing a discovery operation on network, hardware and software resources on which a web-service depends is provided, the method including receiving a request from a client, analyzing the request and available statistics to determine whether the request is likely to succeed and whether the request should be bundled with other requests, if the request is determined to not be likely to succeed, outputting an error message to the client, if the request is determined to be likely to succeed but should not be bundled with other requests, invoking a first service provider relevant to the request, if the request is determined to be likely to succeed and should be bundled with other requests, bundling the request with the other requests and, subsequently, invoking the first and/or a second service provider relevant to the bundled requests, and updating the available statistics to reflect the determinations, the output of the error message, identification information of the first and/or the second service provider and/or the bundled requests.

In accordance with an aspect of the invention, a method of performing a discovery operation on network, hardware and software resources on which a web-service depends is provided and includes receiving a client request, analyzing the request and available statistics to determine whether the request is likely to succeed and whether the request should be bundled with other requests, if the request is determined to not be likely to succeed, outputting a client error message, if the request is determined to be likely to succeed but should not be bundled with other requests, executing the request, if the request is determined to be likely to succeed and should be bundled with other requests, bundling the request with the other requests and, subsequently, executing the bundled requests, and updating the available statistics to reflect the determinations, the output of the client error message, and the executing of any of the requests.

In accordance with an aspect of the invention, a system to perform a discovery operation on network, hardware and software resources on which a web-service depends is provided and includes a dispatcher, which includes a repository, and which, upon receiving a request from a client, is configured to analyze the request and available statistics stored in the repository to determine whether the request is likely to succeed and whether the request should be bundled with other requests, output an error message to the client if the request is determined to not be likely to succeed, invoke a first service provider relevant to the request if the request is determined to be likely to succeed but should not be bundled with other requests, bundle the request with the other requests and, subsequently, invoke the first and/or a second service provider relevant to the bundled requests if the request is determined to be likely to succeed and should be bundled with other requests, and receive data, which is reflective of the determinations and the output of the error message, the first and/or the second service provider and/or the bundled requests, and by which the repository is updated.

BRIEF DESCRIPTIONS OF THE SEVERAL VIEWS OF THE DRAWINGS

Figure 2:
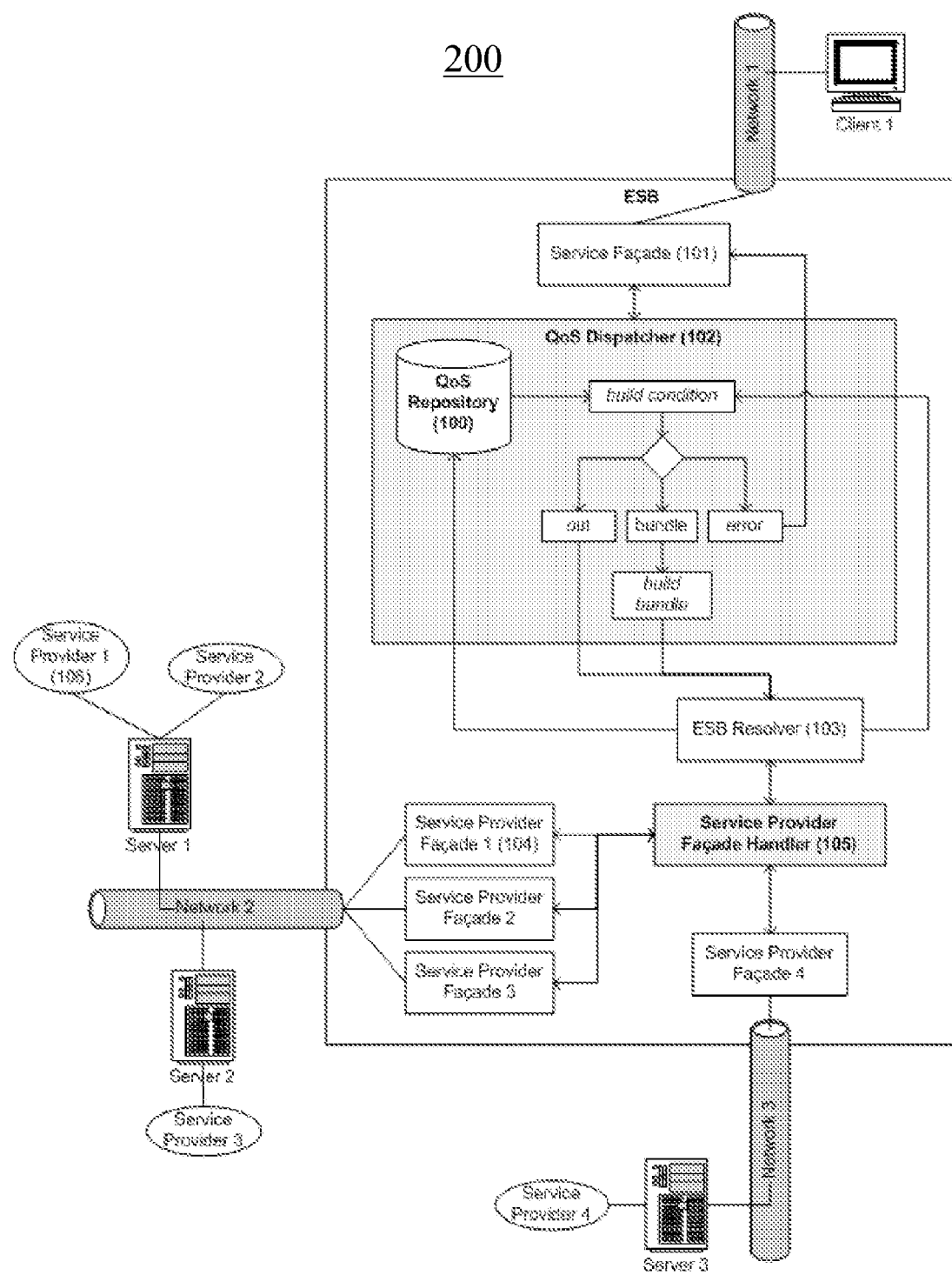

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a flow diagram illustrating a method of performing an exemplary discovery operation in accordance with embodiments of the invention; and FIG. 2 is a schematic diagram of a system to perform an exemplary discovery operation in accordance with embodiments of the invention.

DETAILED DESCRIPTION

A system in accordance with embodiments of the present invention, uses knowledge relating to system infrastructure, surroundings and/or statistics relating to previous service invocations as well as possible knowledge about the business flow of an application to bundle new service invocations on demand if the knowledge indicates that the bundling will improve system performance. That is, the system identifies a need for a bundling (e.g., a multiplexing) of service invocations and determines if the bundling will or will not be done based on a presence or a lack thereof of that identified need. The determination may be based on various factors including, but not limited to, prior success rates of service invocations, urgency, and whether and where non-critical service invocations may be queued to be bundled with further critical service invocations.

In more detail, with reference to FIG. 1, a machine readable medium having instructions stored thereon to cause the machine to execute a method of performing a discovery operation on network, hardware and software resources on which a web-service depends is provided. Here, the machine referred to may be an overall computing system or, as shown in FIG. 2, a middleware component(s), including hardware and software installed therein, which is operationally disposed within a computing system, such as an enterprise service bus (ESB). The machine may be accessible by a client, such as an end user by way of a personal computer, and may be serviced by a plurality of service providers which may be local to the machine or remote. In each case, the client and the service providers communicate with the machine via servers and/or common or varied networks, such as the Internet, with the client and the service providers being represented to the machine by respective service facades, as will be discussed below.

As shown in FIG. 1, the method is initialized by the machine receiving a request from a client (10). Such as request may include a web-service request or, more generally, a service request and may originate from a user using, e.g., a personal computer, which acts as the client. The request is transmitted over a network, such as the Internet, to the machine where the client is represented by a service façade through which the request is transmitted.

Upon receipt of the request, the request is analyzed along with available statistics (20) to determine whether the request has a sufficiently high likelihood for success that exceeds a predetermined threshold and to determine whether the request should be bundled with other requests. Here, a successful request refers to a request that is issued to the relevant service provider in a time period that is shorter or equal to a minimum threshold. Conversely, any request that is unlikely to be issued to the relevant service provider within that time period is determined to be unlikely to be successful.

In accordance with embodiments of the invention, the available statistics may relate to, but are not limited to, availability statistics, which describe availabilities of service providers (e.g., service endpoints), failure rates of service invocations for a specific service endpoint or an associated service façade, and data describing a probability of service invocation sequences. With respect to the data describing the probability of the service invocation sequences, in order to directly utilize the probabilities, it is understood that they may be handled in a decision support system (e.g., a Bayesian Network) and, as will be discussed below, updated over time based on successful and unsuccessful invocations with older data being discarded and/or accorded less weight than new data.

Thus, it is seen that the analyzing (20) may include an analysis of an availability of a first and/or a second service provider (21), an analysis of failure rates of previous requests (22), a request for an identification of the first and/or the second service provider (23) and an analysis of a probability of receipt of the other requests (24). Here, as mentioned above, the analysis of the probability of the receipt of the other requests (24) may itself include a weighing of data of later requests more than that of earlier requests and/or a simple discarded of the older data (25).

Once the analysis of the request is completed, based on results of the analysis, it is determined whether the request has a sufficiently high likelihood for success that exceeds the predetermined threshold (30) and it is further determined whether the request should be bundled with other requests (40).

At this point, if the request is determined to not be likely to succeed, the method includes outputting an error message to the client (50), executing the request and/or executing the request following a pre-determined delay during which conditions for executing the request may be expected to improve.

If, on the other hand, the request is determined to be likely to succeed but it is further determined that the request should not be bundled with other requests, the method includes invoking a first service provider relevant to the request (60) without bundling the request with other requests. Such a decision could be made as being based on data indicating that the request is particularly urgent or otherwise more important than other requests.

If the request is determined to be likely to succeed and it is determined that the request should be bundled with other requests, the method includes bundling the request with the other requests (70) by, e.g., multiplexing the request and the other requests (71), and, subsequently invoking the first and/or a second service provider relevant to the bundled requests (80).

In accordance with embodiments of the invention, the bundling/multiplexing is accomplished as being based on factors that are defined by, e.g., a network infrastructure, user behavior via the client, current, previous and anticipated application load, and response times of previous calls. In addition, it may be seen that non-critical requests and/or masses of asynchronous requests are likely candidates for the bundling (70). The factors may also include business logic requirements, such as internal business instructions that require that a second service provider be invoked directly after a first service provider.

In accordance with a further embodiment of the invention, the request and/or the bundled requests may be queued (95) before the invoking of the first and/or the second service provider is undertaken. The queuing of the request(s) can serve to delay the invoking of the relevant service provider(s) at least until a level of a current application load decreases or is expected to decrease. This way, the request will be prevented from adding to an already elevated application load level. In addition, the queuing of the request may be done to allow for a bundling of the request with other requests, as described above.

The method is completed upon an updating of the available statistics (90) to reflect the determinations, the output of the error message, identification information of the first and/or the second service provider and/or the bundling of the requests. Here, although it is not shown in the drawings, it is understood that the updating (90) could be at least partially accomplished simultaneously with the analyzing (20), the determinations of whether the request will be successful and whether the request should be bundled with other requests (30, 40), the outputting of the error message (50), the invoking of the service provider (60), the bundling of the requests (70) and the invoking of the service provider(s) (80).

Still referring to FIG. 1, in accordance with another aspect of the invention, a method of performing a discovery operation on network, hardware and software resources on which a web-service depends is provided. The method includes receiving a client request (10), analyzing the request and available statistics to determine whether the request is likely to succeed and whether the request should be bundled with other requests (20), if the request is determined to not be likely to succeed (30), outputting a client error message (50), if the request is determined to be likely to succeed but should not be bundled with other requests (40), executing the request (60), if the request is determined to be likely to succeed and should be bundled with other requests (40), bundling the request with the other requests (70) and, subsequently, executing the bundled requests (80), and updating the available statistics to reflect the determinations, the output of the client error message, and the executing of any of the requests (90).

With reference to FIG. 2, a system 200, such as an enterprise service bus (ESB), is provided. The system 200 is configured and disposed to perform a discovery operation on network, hardware and software resources on which a web-service depends. To that end, the system 200 includes a dispatcher 102, such as a Quality of Service (QoS) dispatcher, which may be embodied as a middle component that includes hardware and/or software installed therein. The dispatcher 102 includes a repository 100, such as a QoS repository, which may be embodied as a database of a network.

As shown in FIG. 2, the dispatcher 102, upon receiving a request from Client 1, is configured to analyze the request along with available statistics, which are stored in the repository 100, to thereby determine whether the request is likely to succeed and to determined whether the request should be bundled with other requests. Here, a successful request refers to a request that is issued to the relevant service provider 106 (e.g., service providers 1, 2, 3 and 4) by way of servers 1, 2 and 4, respectively, and networks 1, 2 and 3, respectively) in a time period that is shorter or equal to a minimum threshold. Conversely, any request that is unlikely to be issued to the relevant service provider 106 in that time period is determined to be unlikely to be successful.

In accordance with embodiments of the invention, the analysis of the request and the available statistics may include an analysis of an availability of a first and/or a second service provider 106, an analysis of failure rates of previous requests, a request for an identification of the first and/or the second service provider 106 and an analysis of a probability of receipt of the other requests. As mentioned above, the analysis of the probability of the receipt of the other requests may itself include a weighing of data of later requests more than that of earlier requests and/or a simple discarded of the older data.

The dispatcher 102 is further configured to output an error message to Client 1 if the request is determined to not be likely to succeed, to invoke a first service provider 106 (e.g., service provider 1) relevant to the request if the request is determined to be likely to succeed but should not be bundled with other requests, and to bundle (e.g., multiplex) the request with the other requests and, subsequently, invoke the first and/or a second service provider 106 (e.g., service providers 2, 3 or 4) relevant to the bundled requests if the request is determined to be likely to succeed and should be bundled with other requests.

In accordance with embodiments of the invention, the bundling of the requests is accomplished based on factors that are defined by, e.g., a network infrastructure, user behavior via the client, current, previous and anticipated application load, and response times of previous calls. In addition, it may be seen that non-critical requests and/or masses of asynchronous requests are likely candidates for the bundling. The factors may also include business logic requirements, such as internal business instructions that require that a second service provider 106 be invoked directly but only after an invocation of a first service provider 106.

The dispatcher 102 is still further configured to receive data from a resolver 103, which will be discussed below. Here, the data may be reflective of the determinations of whether the request is likely to succeed and whether the request should be bundled with other requests and the output of the error message, identification information relating to the first and/or the second service provider 106 and/or information regarding the bundled requests. The repository 100 is then updated with the received data.

Still referring to FIG. 2, the system 200 further includes service provider façades (104) 1, 2, 3 and 4 which are configured and disposed within the system 200 to be in signal communication with the Client 1 and the service providers 106. In this manner, each of the service facades (104) respectively represent the Client 1 and the service providers 106 to the system 200, generally, and to the dispatcher 102, specifically.

The resolver 103, may include an ESB resolver, and is configured and disposed within the system 200 to be in signal communication with the dispatcher 102. The resolver 103 is configured to receive instructions from the dispatcher 102 that are reflective of the invoking of the service providers 106. For example, where the dispatcher 102 determines that a request is likely to succeed but should not be bundled with other requests, the dispatcher 102 dispatches the unbundled request to the relevant service provider 106 by way of the resolver 103. Similarly, where the dispatcher 102 determines that a request is likely to succeed and that it should be bundled with other requests, the dispatcher 102 dispatches the bundled requests to the relevant service provider(s) 106 by way of the resolver 103.

The system 200 further includes a handler 105, such as a service provider façade handler, which is configured and disposed within the system 200 to be in signal communication with the resolver 103 and each of the service provider facades 104 of the service providers 106. In this manner, the handler 105 provides for communications between the resolver 103 and the service provider facades 104. In particular, where requests are bundled, the handler 105 would be responsible for unbundling the requests, as necessary. That is, if first and second bundled requests are issued to a first service provider 106, but that service provider 106 is known to be able to only handle the requests sequentially, the handler 105 unbundles the requests, and sends the unbundled requests to the first service provider 106 sequentially. Once both of the requests are completed, the handler 105 may further re-bundle the request responses and transmit them back to the resolver 103.

As an example, a deployed application may rely on 2 different web-services and be experiencing relatively high traffic conditions with a correspondingly high number of service invocations. Service 1 is local and is able to maintain a normal performance level but service 2 is remote and currently has a high latency. By implementing a middleware component, in accordance with the methods and systems described above, which is aware of the various parameter sets of services 1 and 2, the middleware component can be used to issue error messages, deliver individual service invocations or bundle vectors of the service invocations and deliver them uniformly to their proper destination service if local constraints show a necessity for any of these actions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A method of performing a discovery operation on network, hardware and software resources on which a web-service depends, the method comprising:
    receiving a request from a client;
    analyzing the request and available statistics to determine whether the request is likely to succeed and whether the request should be bundled with other requests, wherein the analyzing consists of analyzing an availability of a first and/or a second service provider, analyzing failure rates of previous requests and analyzing a probability of receipt of the other requests, the analyzing of the probability of the receipt of the other requests comprising weighing data of later requests more than that of earlier requests;
    if the request is determined to not be likely to succeed, outputting an error message to the client;
    if the request is determined to be likely to succeed but should not be bundled with other requests, invoking the first service provider relevant to the request;
    if the request is determined to be likely to succeed and should be bundled with other requests, bundling the request with the other requests and, subsequently, invoking the first and/or the second service provider relevant to the bundled requests;
    and updating the available statistics to reflect the determinations, the output of the error message, identification information of the first and/or the second service provider and/or the bundled requests.

2. The method according to claim 1, wherein the analyzing further consists of requesting an identification of the first and/or the second service provider.

3. The method according to claim 1, wherein the bundling comprises multiplexing the request and the other requests.

4. The method according to claim 1, further comprising queuing the invoking of the of first and/or the second service provider.

5. The method according to claim 1, wherein the analyzing further consists of analyzing the request and the available statistics to determine whether the request is non-critical and should be bundled with other non-critical requests.

6. The method according to claim 1, wherein the analyzing further consists of analyzing the request and the available statistics to determine whether the request should be bundled in a mass of asynchronous requests.

7. A non-transitory machine readable medium having executable instructions stored thereon, which are stored on a storage unit of a machine, and which cause a processing unit of the machine to perform a discovery operation on network, hardware and software resources on which a web-service depends in accordance with the method of claim 1.

8. A system to perform a discovery operation on network, hardware and software resources on which a web-service depends, the system comprising:
    a dispatcher, which includes a repository, and which, upon receiving a request from a client, is configured to:
    analyze the request and available statistics stored in the repository to determine whether the request is likely to succeed and whether the request should be bundled with other requests, wherein the analyzing consists of analyzing an availability of a first and/or a second service provider, analyzing failure rates of previous requests and analyzing a probability of receipt of the other requests, the analyzing of the probability of the receipt of the other requests comprising weighing data of later requests more than that of earlier requests,
    output an error message to the client if the request is determined to not be likely to succeed,
    invoke the first service provider relevant to the request if the request is determined to be likely to succeed but should not be bundled with other requests,
    bundle the request with the other requests and, subsequently, invoke the first and/or the second service provider relevant to the bundled requests if the request is determined to be likely to succeed and should be bundled with other requests, and
    receive data, which is reflective of the determinations and the output of the error message, the first and/or the second service provider and/or the bundled requests, and by which the repository is updated.

9. The system according to claim 8, wherein the dispatcher is configured to request an identification of the first and/or the second service provider.

10. The system according to claim 8, wherein the dispatcher is configured to bundle the request and the other requests by multiplexing the request and the other requests.

11. The system according to claim 8, wherein the dispatcher is further configured to queue the request and/or the other requests.

12. The system according to claim 8, further comprising:
    service provider facades, in signal communication with the client and the first and second service providers, to respectively represent the client and the first and second service providers to the dispatcher; and
    a resolver, in signal communication with the dispatcher, which is to receive instructions from the dispatcher reflective of the invoking of the first and/or the second service providers and to output the data, by which the repository is updated, to the dispatcher.

13. The system according to claim 12, further comprising a handler, in signal communication with the resolver and the service provider facades of the first and second service providers, by which communication among the resolver and the service provider facades occurs.

14. The system according to claim 8, wherein the web-service comprises an enterprise service bus (ESB).

15. A method of performing a discovery operation on network, hardware and software resources on which a web-service depends, the method comprising:
    receiving a request from a client;
    analyzing the request and available statistics to determine whether the request is likely to be issued to a relevant service provider within a time period shorter than or equal to a minimum threshold and whether the request should be bundled with other requests;
    if the request is determined to not be likely to be issued within the time period, outputting an error message to the client;
    if the request is determined to be likely to be issued within the time period but should not be bundled, issuing the request to a first relevant service provider via a handler and then a first service provider facade associated with the first service provider;
    if the request is determined to be likely to be issued within the time period and should be bundled, bundling the request with the other requests and, subsequently, issuing each of the bundled requests to the first relevant service provider and/or a second relevant service provider via the handler and then the first service provider facade and/or a second service provider facade associated with the second service provider; and
    updating the available statistics to reflect the determinations, the output of the error message, identification information of the first and/or the second service provider and/or the bundled requests.

16. A method of performing a discovery operation on network, hardware and software resources on which a web-service depends, the method comprising:
    receiving a request from a client;
    analyzing the request and available statistics to determine whether the request is likely to succeed and whether the request should be bundled with other requests;
    if the request is determined to not be likely to succeed, outputting an error message to the client;
    if the request is determined to be likely to succeed but should not be bundled with other requests, invoking a first service provider relevant to the request;
    if the request is determined to be likely to succeed and should be bundled with other requests, bundling the request with the other requests and, subsequently, invoking the first and/or a second service provider relevant to the bundled requests; and
    updating the available statistics to reflect the determinations, the output of the error message, identification information of the first and/or the second service provider and/or the bundled requests, wherein the analyzing comprises analyzing the request and the available statistics to determine whether the request is likely to be issued to a relevant service provider within a time period shorter than or equal to a minimum threshold, the method further comprising:
    issuing the request to a first relevant service provider via a handler and then a first service provider facade associated with the first service provider if the request is determined to be likely to be issued within the time period but should not be bundled;
    and bundling the request with the other requests and, subsequently, issuing each of the bundled requests to the first relevant service provider and/or a second relevant service provider via the handler and then the first service provider facade and/or a second service provider facade associated with the second service provider if the request is determined to be likely to be issued within the time period and should be bundled.

17. A method of performing a discovery operation on network, hardware and software resources on which a web-service depends, the method comprising:
    receiving a request from a client;
    analyzing the request and available statistics to determine whether the request is likely to succeed and whether the request should be bundled with other requests;
    if the request is determined to not be likely to succeed, outputting an error message to the client;
    if the request is determined to be likely to succeed but should not be bundled with other requests, invoking a first service provider relevant to the request;
    if the request is determined to be likely to succeed and should be bundled with other requests, bundling the request with the other requests and, subsequently, invoking the first and/or a second service provider relevant to the bundled requests; and
    updating the available statistics to reflect the determinations, the output of the error message, identification information of the first and/or the second service provider and/or the bundled requests, wherein the analyzing comprises analyzing the request and the available statistics to determine whether the request should be bundled with other requests based on a network infrastructure, user behavior via the client and current and previous and anticipated application load, response times of previous calls and business logic requirements.

* * * * *